United States Patent
Sukhomlinov et al.

(10) Patent No.: US 10,346,615 B2
(45) Date of Patent: Jul. 9, 2019

(54) RULE DRIVEN PATCH PRIORITIZATION

(71) Applicant: Intel Corporation, Santa Clara, CA (US)

(72) Inventors: Vadim Sukhomlinov, Santa Clara, CA (US); Anant Raman, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 195 days.

(21) Appl. No.: 15/394,273

(22) Filed: Dec. 29, 2016

(65) Prior Publication Data

US 2018/0189497 A1   Jul. 5, 2018

(51) Int. Cl.
| | |
|---|---|
| *G06F 21/00* | (2013.01) |
| *G06F 21/57* | (2013.01) |
| *G06F 8/65* | (2018.01) |
| *G06F 21/56* | (2013.01) |
| *G06F 21/50* | (2013.01) |
| *G06F 21/60* | (2013.01) |

(52) U.S. Cl.
CPC ............ *G06F 21/577* (2013.01); *G06F 8/65* (2013.01); *G06F 21/50* (2013.01); *G06F 21/568* (2013.01); *G06F 21/604* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 5,819,045 A | 10/1998 | Raman et al. | |
| 7,533,186 B2 | 5/2009 | Raman | |
| 7,733,906 B2 | 6/2010 | Raman et al. | |
| 9,692,778 B1 * | 6/2017 | Mohanty | H04L 63/1433 |
| 2004/0049372 A1 * | 3/2004 | Keller | H04L 41/06 |
| | | | 703/22 |

OTHER PUBLICATIONS

"Common Vulnerabilities and Exposures," retrieved from cve.mitre.org on Nov. 18, 2016, 2 pages.

* cited by examiner

*Primary Examiner* — Andrew J Steinle
(74) *Attorney, Agent, or Firm* — Jordan IP Law, LLC (57) ABSTRACT

An embodiment of an electronic processing apparatus may include a database constructor to construct a dependency database of deployed components in an environment, a vulnerability tracer to trace a vulnerability against the dependency database and to determine one or more affected deployed components based on the trace, and a vulnerability resolver to retrieve environment-specific rules based on the determined one or more affected deployed components and to prioritize mitigation of the vulnerability for the one or more affected deployed components based at least in part on the retrieved environment-specific rules.

22 Claims, 8 Drawing Sheets

RULE DRIVEN PATCH PRIORITIZATION

TECHNICAL FIELD

Embodiments generally relate to data security. More particularly, embodiments relate to rule driven patch prioritization.

BACKGROUND

Prioritization of production systems updates with the latest security patches may be challenging. Validation of each patch may require extensive testing on limited set of systems to detect potential incompatibilities. Security may be a high priority but may compete with uptime and time to market. The impact of security patching on applications may not be known due to unavailability of focused tests, resulting in longer than usual regression tests.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
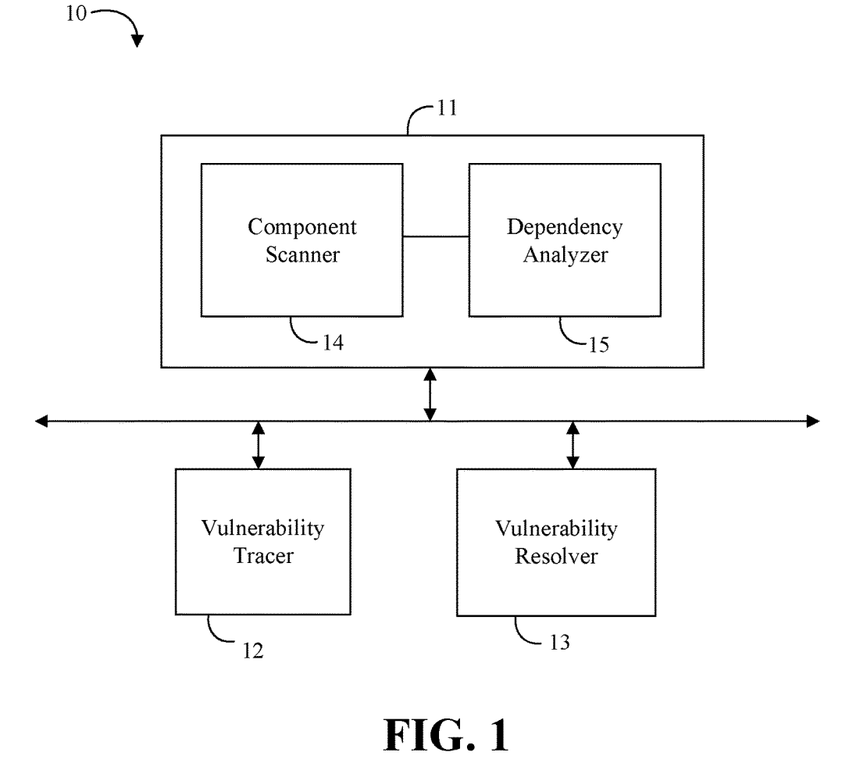
FIG. 1 is a block diagram of an example of an electronic processing apparatus according to an embodiment.
Figure 2A:
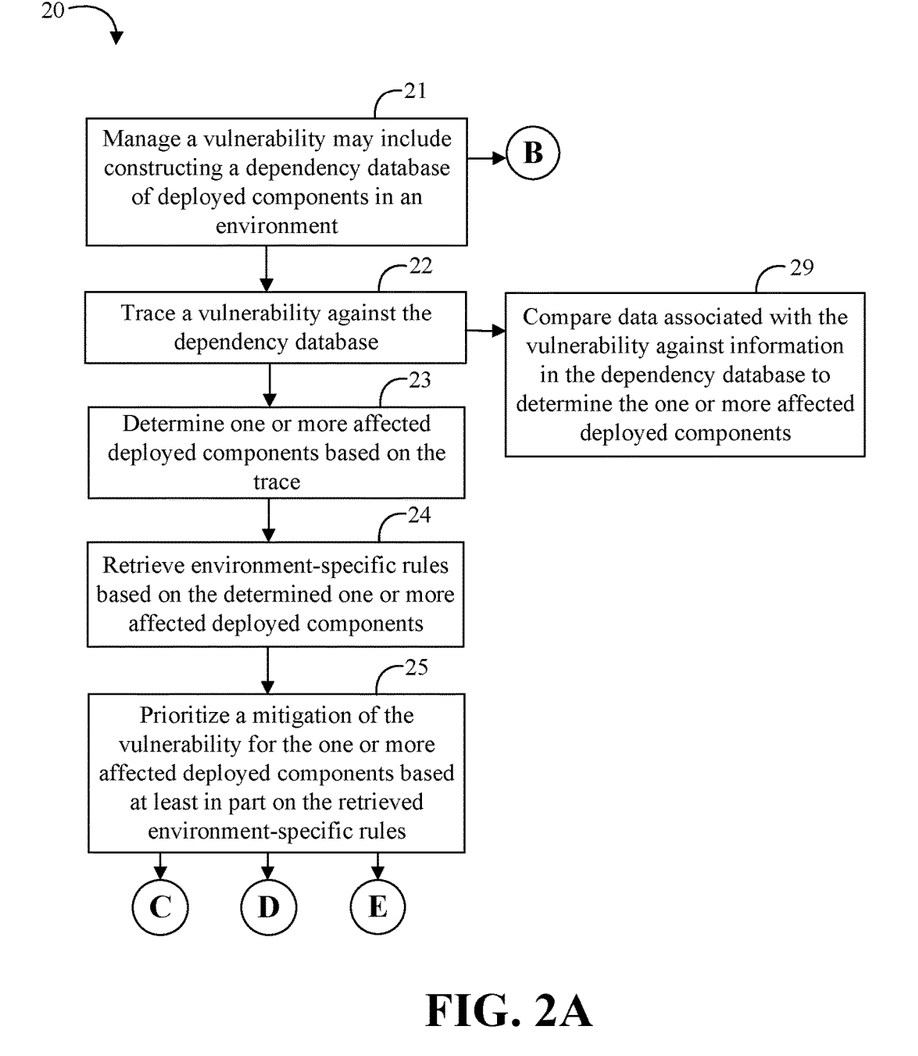
FIGS. 2A to 2E are flowcharts of an example of a method of managing a vulnerability according to an embodiment.
Figure 2B:
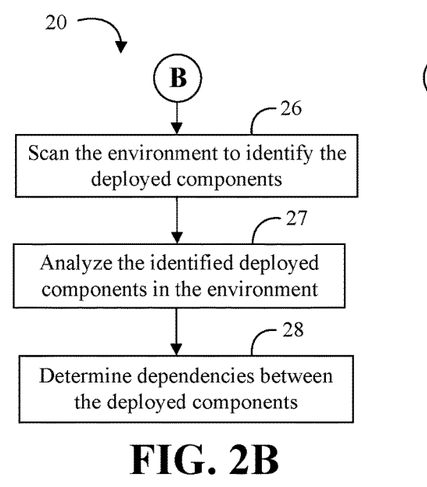
Figure 2C:
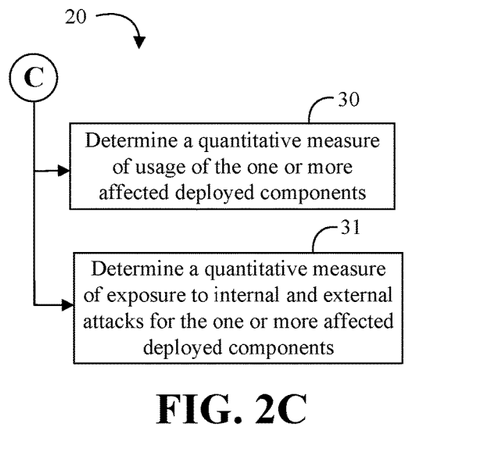
Figure 2D:
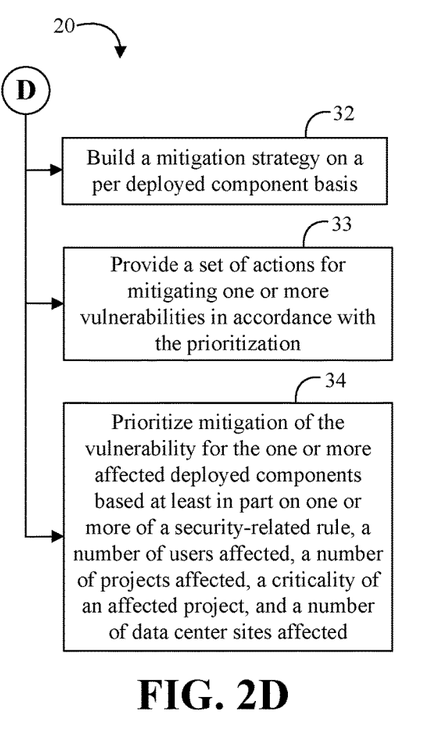
Figure 2E:
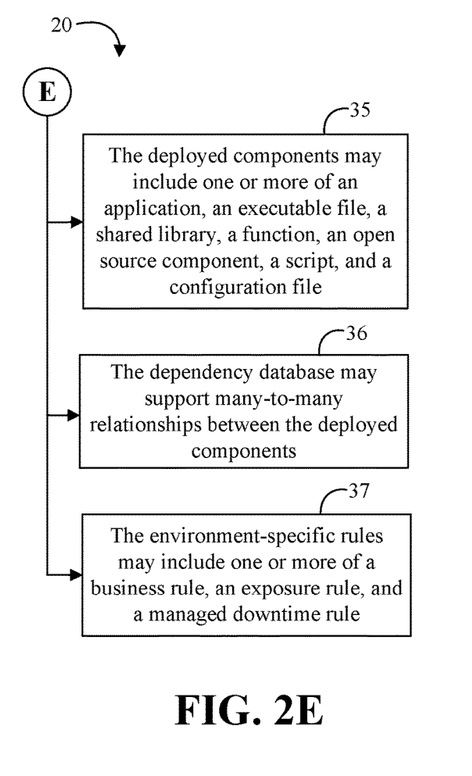

Turning now to FIG. 1, an embodiment of an electronic processing apparatus 10 may include a database constructor 11 to construct a dependency database of deployed components in an environment, a vulnerability tracer 12 communicatively coupled to the database constructor 11 to trace a vulnerability against the dependency database and to determine one or more affected deployed components based on the trace, and a vulnerability resolver 13 communicatively coupled to the vulnerability tracer 12 to retrieve environment-specific rules based on the determined one or more affected deployed components and to prioritize mitigation of the vulnerability for the one or more affected deployed components based at least in part on the retrieved environment-specific rules. For example, the database constructor 11 may include a component scanner 14 to scan the environment to identify the deployed components, and a dependency analyzer 15 to analyze the identified deployed components in the environment and to determine dependencies between the deployed components.

Embodiments of each of the above database constructor 11, vulnerability tracer 12, vulnerability resolver 13, component scanner 14, dependency analyzer 15, and other components of the electronic processing apparatus 10 may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or in fixed-functionality logic hardware using circuit technology such as, for example, application specific integrated circuit (ASIC), complementary metal oxide semiconductor (CMOS) or transistor-transistor logic (TTL) technology, or any combination thereof. Alternatively, or additionally, some operational aspects of these components may be implemented in one or more modules as a set of logic instructions stored in a machine- or computer-readable storage medium such as RAM, read only memory (ROM), programmable ROM (PROM), firmware, flash memory, etc., to be executed by a processor or computing device. For example, computer program code to carry out the operations of the components may be written in any combination of one or more operating system applicable/appropriate programming languages, including an object oriented programming language such as PYTHON, PERL, JAVA, SMALLTALK, C++, C# or the like and conventional procedural programming languages, such as the "C" programming language or similar programming languages.

Turning now to FIGS. 2A to 2E, an embodiment of a method 20 of managing a vulnerability may include constructing a dependency database of deployed components in an environment at block 21, tracing a vulnerability against the dependency database at block 22, determining one or more affected deployed components based on the trace at block 23, retrieving environment-specific rules based on the determined one or more affected deployed components at block 24, and prioritizing a mitigation of the vulnerability for the one or more affected deployed components based at least in part on the retrieved environment-specific rules at block 25. For example, constructing the dependency database may include scanning the environment to identify the deployed components at block 26, analyzing the identified deployed components in the environment at block 27, and determining dependencies between the deployed components at block 28.

In some embodiments of the method 20, tracing the vulnerability against the dependency database may include comparing data associated with the vulnerability against information in the dependency database to determine the one or more affected deployed components at block 29. In some embodiments, prioritizing the mitigation may include determining a quantitative measure of usage of the one or more affected deployed components at block 30 and/or determining a quantitative measure of exposure to internal and external attacks for the one or more affected deployed components at block 31. The method 20 may further include building a mitigation strategy on a per deployed component basis at block 32, providing a set of actions for mitigating one or more vulnerabilities in accordance with the prioritization at block 33, and/or prioritizing mitigation of the vulnerability for the one or more affected deployed components based at least in part on one or more of a security-related rule, a number of users affected, a number of projects affected, a criticality of an affected project, and a number of data center sites affected at block 34.

In any of the embodiments herein, the deployed components may include one or more of an application, an executable file, a shared library, a function, an open source component, a script, and a configuration file (e.g. at block 35), the dependency database may support many-to-many relationships between the deployed components (e.g. at block 36), and/or the environment-specific rules may include one or more of a business rule, an exposure rule, and a managed downtime rule (e.g. at block 37).

Embodiments of the method 20 may be implemented in an electronic processing system or a memory apparatus such as, for example, those described herein. More particularly, hardware implementations of the method 20 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 20 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more operating system applicable/appropriate programming languages, including an object oriented programming language such as PYTHON, PERL, JAVA, SMALLTALK, C++ or the like and conventional procedural programming languages, such as the "C" programming language or similar programming languages. For example, embodiments of the method 20 may be implemented on a computer readable medium as described in connection with Examples 12 to 22 below.

Advantageously, some embodiments may provide for risk analysis and prioritization of security patching of applications in a production environment. Some embodiments may provide automated risk analysis and patch prioritization, which may advantageously reduce regression test time for security patching. Some embodiments may provide a solution for enterprise security management. As noted above, prioritization of production systems updates with the latest security patches may be challenging and may in some environments result in long regression test times. Some embodiments may reduce regression test time with less risk by analyzing the impact of vulnerabilities for a particular environment.

The severity and priority of security patches may be set by vendors or information security personnel with little regard or insight into specific business impacts. For example, a business may have priorities driven by revenue, customer commitments, time to market, and/or other impacts to the business. On the other hand, security concerns may not be equitable across the different impacts. For example, a hypertext preprocessor language (PHP) vulnerability in a decision-support application may not be as impactful as the same vulnerability in a core-business application. Some embodiments may provide a more application-centric security prioritization. For example, server or enterprise environments may particularly benefit from a security approach in accordance with some embodiments, where downtime may be scarce and release/change management policies may be stringent. Some embodiments may provide more informed decisions on security patching with reduced or minimal business impact by analyzing the impact of the vulnerabilities to each application running in the environment.

Figure 3:
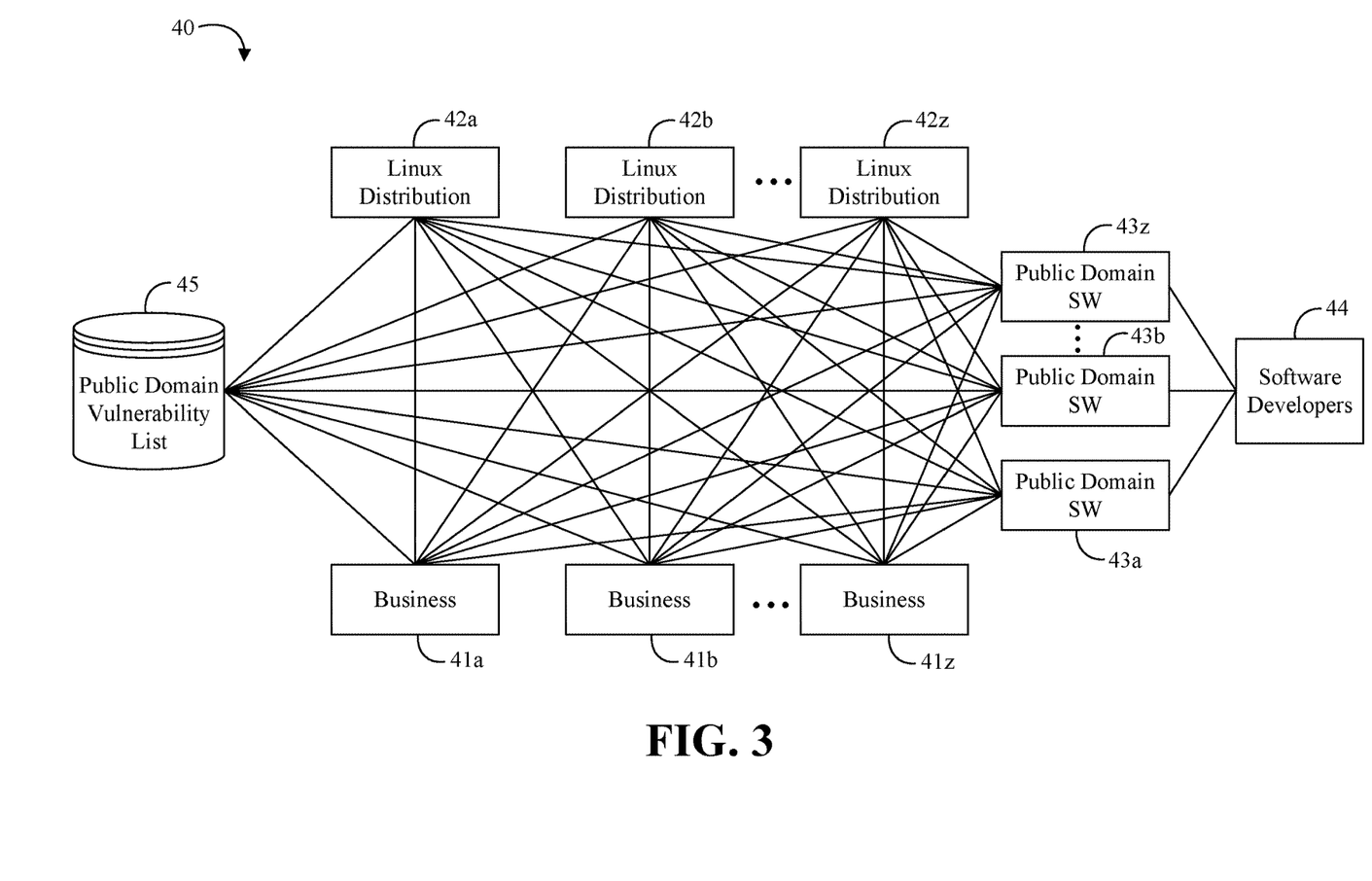
FIG. 3 is a block diagram of an example of a production environment according to an embodiment.

Turning now to FIG. 3, an embodiment of a production environment 40 may include one or more business units 41a, 41b, through 41z utilizing one or more LINUX distributions 42a, 42b, through 42z, and/or one or more public domain software applications 43a, 43b, through 43z (e.g. provided by software developers 34). A public domain vulnerability list 35 may include information about vulnerabilities related to the LINUX distributions, the public domain software, and/or other components deployed at the business units. The adoption of public domain software in business has grown tremendously (e.g. due to availability and lower costs). However, contrasted with the high number of vulnerabilities and the complex integration with other public and private applications with various operating system distributions, security patching complexity has grown exponentially in an uncontrolled manner. Advantageously, some embodiments may determine patching priority of information technology (IT) software based on automated estimates of a vulnerability impact to application functionalities (e.g. taking into consideration exposure of vulnerabilities to internal and external attacks, and other criteria). For example, some embodiments may build a tracing of known vulnerabilities to all the different software components deployed at a business unit (e.g. including public, proprietary, homegrown, etc.) as described in more detail below.

Figure 4:
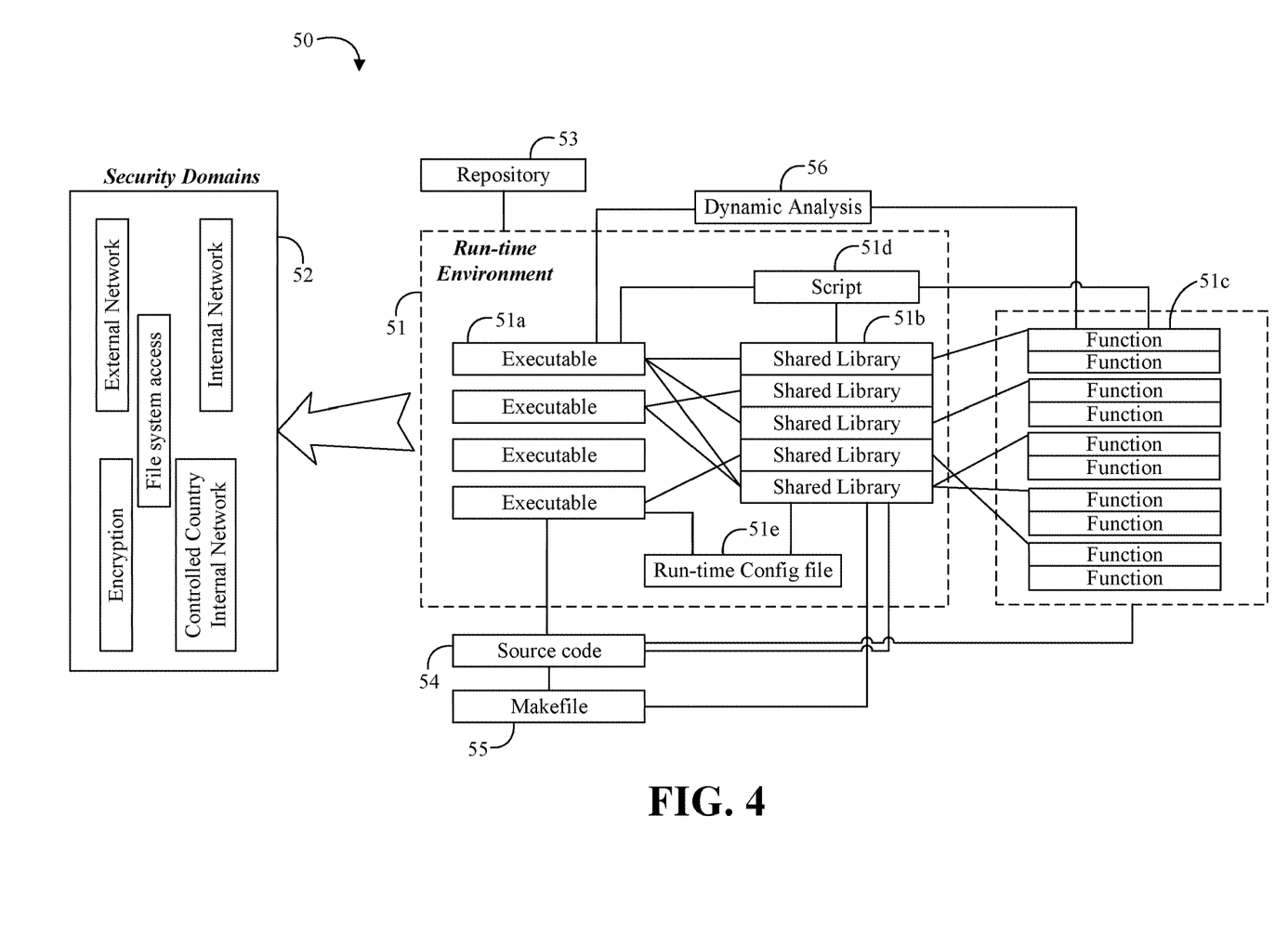
FIG. 4 is a block diagram of an example of another production environment according to an embodiment.

Turning now to FIG. 4, an embodiment of a production environment 50 may include a run-time environment 51 supporting various security domains 52. For example, the security domains 52 may include encryption, file system access, an external network, an internal network, and/or a controlled country internal network. The run-time environment 51 may include numerous deployed components including one or more executables 51a, and each executable 51a may have one or more shared libraries 51b (including libraries shared among the one or more executables), and each shared library 51b may have one or more functions 51c. The run-time environment 51 may further include scripts 51d and/or run-time configuration files 51e. Outside the run-time environment 51, the environment 50 may further include a repository 53, source code 54, and a makefile 55.

In accordance with some embodiments, a dependency database (DB) may be constructed by an automated analysis 56 of all application binaries in the environment 50, and its associated open source components, scripts and configurations. For example, each patch may be described by a list of common vulnerabilities and exposures (CVE) descriptions including vulnerable functions and libraries with corresponding fixes. By matching patch data with the dependency DB and additional attributes (e.g. security domains, build process, etc.), it may be possible to determine or estimate which applications will be affected, and enable patching/testing based on the highest priority for the business (e.g. the specific environment), the exposure to external and/or internal attacks, and/or managed application downtime.

In some other systems, the only prioritization of patches may be based on a severity level provided mainly by external parties. For example, the prevailing method of patching typically may require downtime, particularly due to the lack of mapping of applications to required dynamic libraries across the entire system. The applications may be terminated to ensure proper replacement of old libraries with new ones. The downtime may need to be coordinated across tens of thousands of end users across hundreds of thousands of servers worldwide using thousands of applications. Advantageously, with proper mapping of applications to vulnerable functions and libraries, some embodiments may determine the number of applications and the related impact of vulnerability and build a custom upgrade strategy on a per application basis as opposed to a global shutdown of entire environment. Some embodiments may allow focused testing and deployment of the security patching as opposed to massive regression testing for all applications in all environments.

Figure 5:
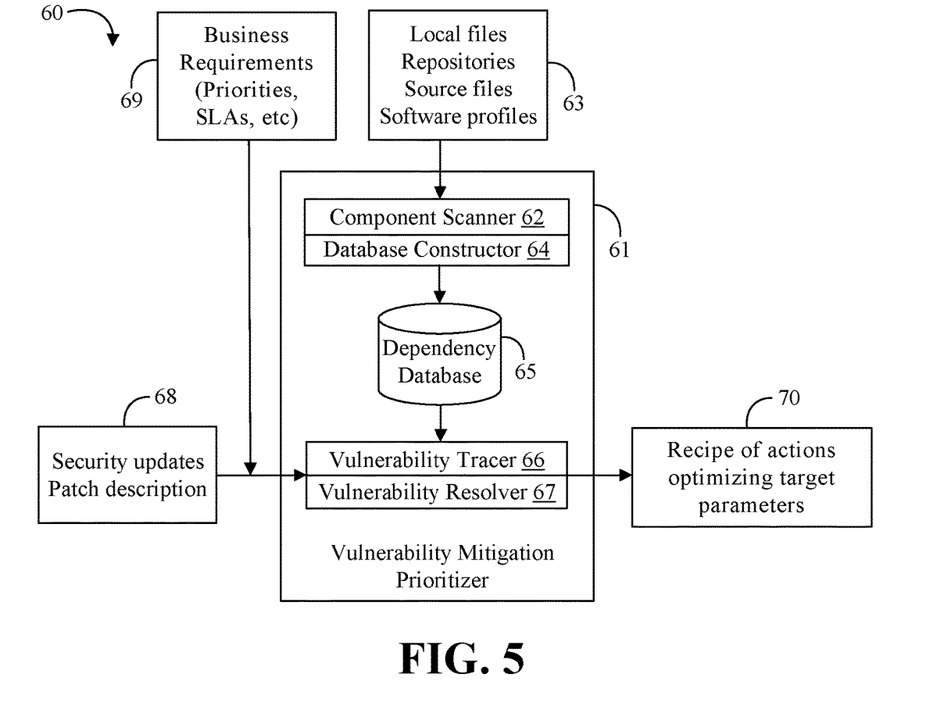
FIG. 5 is a block diagram of an example of an electronic processing system according to an embodiment.

Turning now to FIG. 5, an embodiment of an electronic processing system 60 may include a vulnerability mitigation prioritizer 61 which may include a component scanner 62 to parse executables, source files, repositories, scripts and configuration files (e.g. from a repository 63 of local files, source files, software profiles, etc.), a database constructor 64 to construct a dependency DB 65 (e.g. containing details of how libraries, functions, modules are used in the environment), and a vulnerability tracer 66 and vulnerability resolver 67 to retrieve/load patch descriptions (e.g. from a security updates, patch description source 68), resolve dependencies through the dependency DB, and prioritize mitigation of the vulnerability (e.g. based at least in part on a set of rules from a business requirements source 69). Patch metadata may include information on what libraries, functions, applications, kernel modules, and/or operating system (OS) versions/builds are affected. Such data may be publicly available, for example, from cve.mitre.org.

For example, the vulnerability resolver 66 may determine a quantitative measure of usage, exposure to internal external attacks, etc. using business criteria as another input (e.g. including regulatory requirements). The output of the vulnerability mitigation prioritizer 61 may include a recipe of actions 70 to improve or optimize target parameters (e.g. like those discussed below related to prioritization). In some embodiments, tracing vulnerabilities against deployed components may be done by static and/or dynamic analysis of run-time. The dependency DB may contain many-to-many dependency relationships among the entities.

In some embodiments, static scanning may include executables and source files/makefiles/build options. For example, scanning from executables may include shared libraries used and functions within the shared libraries. Scanning from source files/makefiles/build options may include shared libraries used and/or linked, and functions within the shared libraries, including inline functions. Dynamic scanning may include OS or system tools to scan the run-time environment. Various public domain tools may provide such scanning. Dynamic scanning may also include scanning log files which indicate running processes and/or network access.

In accordance with some embodiments, prioritization of vulnerability mitigation may be based on one or more of the following attributes (e.g. as represented in a set of rules): 1) security aspects (e.g. used security domains—internal/external network, controlled countries, shared filesystems, etc.); 2) number of users affected; 3) number of projects and their criticality; and/or 4) number of different data center sites affected.

Figure 6:
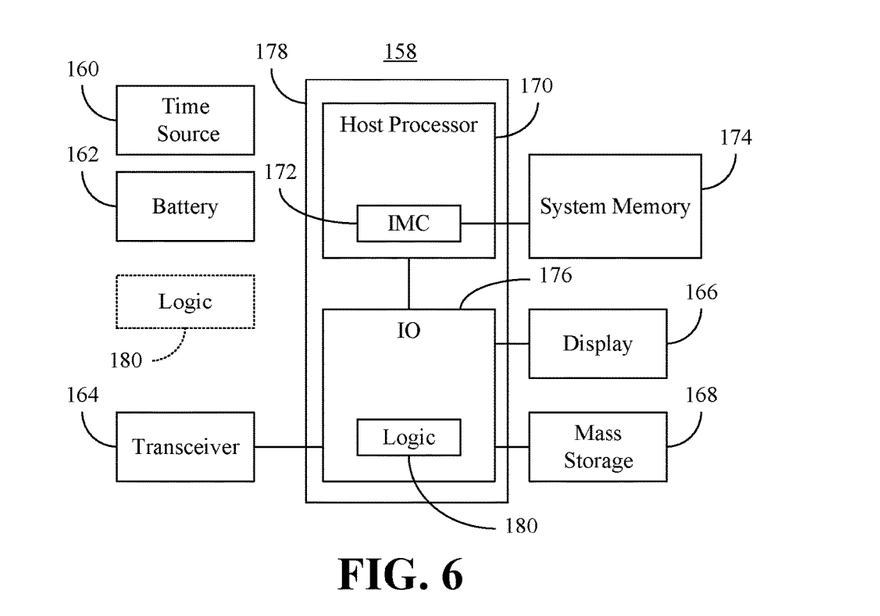
FIG. 6 is a block diagram of an example of a computing device according to an embodiment.

FIG. 6 shows a computing device 158 that may be readily substituted for one or more of the electronic processing apparatus 10 (FIG. 1), the environment 50 (FIG. 4), and/or the vulnerability mitigation prioritizer 61 (FIG. 5), already discussed. In the illustrated example, the device 158 includes a time source 160 (e.g., crystal oscillator, clock), a battery 162 to supply power to the device 158, a transceiver 164 (e.g., wireless or wired), a display 166 and mass storage 168 (e.g., hard disk drive/HDD, solid state disk/SSD, optical disk, flash memory). The device 158 may also include a host processor 170 (e.g., CPU) having an integrated memory controller (IMC) 172, which may communicate with system memory 174. The system memory 174 may include, for example, dynamic random access memory (DRAM) configured as one or more memory modules such as, for example, dual inline memory modules (DIMMs), small outline DIMMs (SODIMMs), etc. The illustrated device 158 also includes an input output (IO) module 176 implemented together with the processor 170 on a semiconductor die 178 as a system on chip (SoC), wherein the IO module 176 functions as a host device and may communicate with, for example, the display 166, the transceiver 164, the mass storage 168, and so forth. The mass storage 168 may include non-volatile memory (NVM) that stores one or more keys (e.g., MAC generation keys, encryption keys).

The IO module 176 may include logic 180 that causes the semiconductor die 178 to operate as a vulnerability mitigation prioritizer such as, for example electronic processing apparatus 10 (FIG. 1), the environment 50 (FIG. 4), and/or the vulnerability mitigation prioritizer 61 (FIG. 5). Thus, the logic 180 may construct a dependency database of deployed components in an environment, trace a vulnerability against the dependency database, determine one or more affected deployed components based on the trace, retrieve environment-specific rules based on the determined one or more affected deployed components, and prioritize mitigation of the vulnerability for the one or more affected deployed components based at least in part on the retrieved environment-specific rules. Additionally, the logic 180 may scan the environment to identify the deployed components, analyze the identified deployed components in the environment, and determine dependencies between the deployed components. The logic 180 may also compare data associated with the vulnerability against information in the dependency database to determine the one or more affected deployed components.

Moreover, the logic 180 may also determine a quantitative measure of usage of the one or more affected deployed components, determine a quantitative measure of exposure to internal and external attacks for the one or more affected deployed components, build a mitigation strategy on a per deployed component basis, provide a set of actions for mitigating one or more vulnerabilities in accordance with the prioritization, and/or prioritize mitigation of the vulnerability for the one or more affected deployed components based at least in part on one or more of a security-related rule, a number of users affected, a number of projects affected, a criticality of an affected project, and a number of data center sites affected. In one example, the time source 160 is autonomous/independent from the controller in order to enhance security (e.g., to prevent the controller from tampering with cadence, frequency, latency and/or timestamp data). The logic 180 may also be implemented elsewhere in the device 158.

Figure 7:
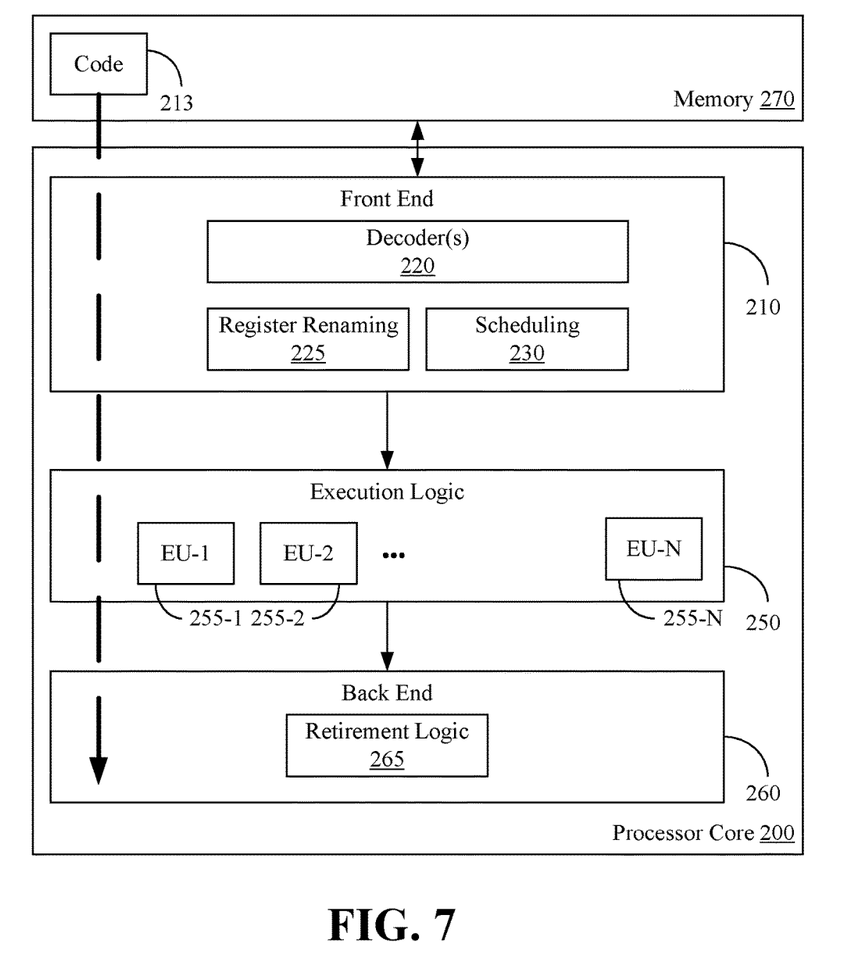
FIG. 7 is a block diagram of an example of a processor according to an embodiment.

FIG. 7 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 7, a processing element may alternatively include more than one of the processor core 200 illustrated in FIG. 7. The processor core 200 may be a single-threaded core or, for at least one embodiment, the processor core 200 may be multithreaded in that it may include more than one hardware thread context (or "logical processor") per core.

FIG. 7 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 20 (FIGS. 2A to 2E), already discussed. The processor core 200 follows a program sequence of instructions indicated by the code 213. Each instruction may enter a front end portion 210 and be processed by one or more decoders 220. The decoder

220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 7, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 8:
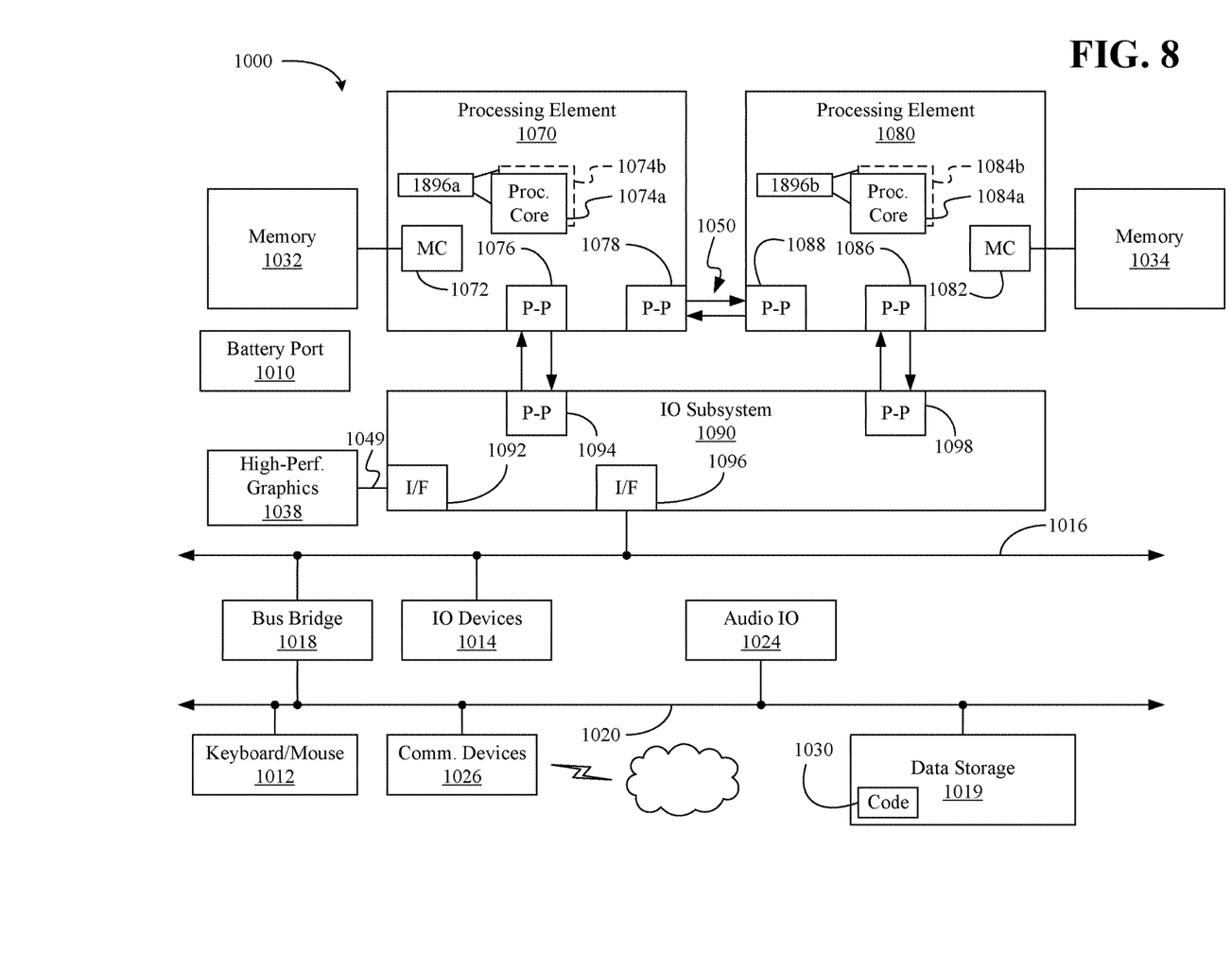
FIG. 8 is a block diagram of an example of a computing system according to an embodiment.

Referring now to FIG. 8, shown is a block diagram of a computing system 1000 embodiment in accordance with an embodiment. Shown in FIG. 8 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 8 may be implemented as a multi-drop bus rather than point-to-point interconnect.

As shown in FIG. 8, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 7.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 8, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 and 1086, respectively. As shown in FIG. 8, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments is not so limited.

As shown in FIG. 8, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 20 (FIGS. 2A to 2E), already discussed, and may be similar to the code 213 (FIG. 7), already discussed. Further, an audio I/O 1024 may be coupled to second bus 1020 and a battery port 1010 may supply power to the computing system 1000.

Note that other embodiments are contemplated. For example, instead of the point-to-point architecture of FIG. 8, a system may implement a multi-drop bus or another such communication topology. Also, the elements of FIG. 8 may alternatively be partitioned using more or fewer integrated chips than shown in FIG. 8.

ADDITIONAL NOTES AND EXAMPLES

Example 1 may include a method of managing a vulnerability, comprising constructing a dependency database of deployed components in an environment, tracing a vulnerability against the dependency database, determining one or more affected deployed components based on the trace, retrieving environment-specific rules based on the determined one or more affected deployed components, and prioritizing mitigation of the vulnerability for the one or more affected deployed components based at least in part on the retrieved environment-specific rules.

Example 2 may include the method of Example 1, further comprising scanning the environment to identify the deployed components, analyzing the identified deployed components in the environment, and determining dependencies between the deployed components.

Example 3 may include the method of Example 1, further comprising comparing data associated with the vulnerability against information in the dependency database to determine the one or more affected deployed components.

Example 4 may include the method of Example 1, further comprising determining a quantitative measure of usage of the one or more affected deployed components.

Example 5 may include the method of Example 1, further comprising determining a quantitative measure of exposure to internal and external attacks for the one or more affected deployed components.

Example 6 may include the method of Example 1, further comprising building a mitigation strategy on a per deployed component basis.

Example 7 may include the method of Example 1, further comprising providing a set of actions for mitigating one or more vulnerabilities in accordance with the prioritization.

Example 8 may include the method of any of Examples 1 to 7, further comprising prioritizing mitigation of the vulnerability for the one or more affected deployed components based at least in part on one or more of a security-related rule, a number of users affected, a number of projects affected, a criticality of an affected project, and a number of data center sites affected.

Example 9 may include the method of any of Examples 1 to 7, wherein the deployed components include one or more of an application, an executable file, a shared library, a function, an open source component, a script, and a configuration file.

Example 10 may include the method of any of Examples 1 to 7, wherein the dependency database supports many-to-many relationships between the deployed components.

Example 11 may include the method of any of Examples 1 to 7, wherein the environment-specific rules include one or more of a business rule, an exposure rule, and a managed downtime rule.

Example 12 may include at least one computer readable medium, comprising a set of instructions, which when executed by a computing device, cause the computing device to construct a dependency database of deployed components in an environment, trace a vulnerability against the dependency database, determine one or more affected deployed components based on the trace, retrieve environment-specific rules based on the determined one or more affected deployed components, and prioritize mitigation of the vulnerability for the one or more affected deployed components based at least in part on the retrieved environment-specific rules.

Example 13 may include the at least one computer readable medium of Example 12, comprising a further set of instructions, which when executed by the computing device, cause the computing device to scan the environment to identify the deployed components, analyze the identified deployed components in the environment, and determine dependencies between the deployed components.

Example 14 may include the at least one computer readable medium of Example 12, comprising a further set of instructions, which when executed by the computing device, cause the computing device to compare data associated with the vulnerability against information in the dependency database to determine the one or more affected deployed components.

Example 15 may include the at least one computer readable medium of Example 12, comprising a further set of instructions, which when executed by the computing device, cause the computing device to determine a quantitative measure of usage of the one or more affected deployed components.

Example 16 may include the at least one computer readable medium of Example 12, comprising a further set of instructions, which when executed by the computing device, cause the computing device to determine a quantitative measure of exposure to internal and external attacks for the one or more affected deployed components.

Example 17 may include the at least one computer readable medium of Example 12, comprising a further set of instructions, which when executed by the computing device, cause the computing device to build a mitigation strategy on a per deployed component basis.

Example 18 may include the at least one computer readable medium of Example 12, comprising a further set of instructions, which when executed by the computing device, cause the computing device to provide a set of actions for mitigating one or more vulnerabilities in accordance with the prioritization.

Example 19 may include the at least one computer readable medium of any of Examples 12 to 18, comprising a further set of instructions, which when executed by the computing device, cause the computing device to prioritize mitigation of the vulnerability for the one or more affected deployed components based at least in part on one or more of a security-related rule, a number of users affected, a number of projects affected, a criticality of an affected project, and a number of data center sites affected.

Example 20 may include the at least one computer readable medium of any of Examples 12 to 18, wherein the deployed components include one or more of an application, an executable file, a shared library, a function, an open source component, a script, and a configuration file.

Example 21 may include the at least one computer readable medium of any of Examples 12 to 18, wherein the dependency database supports many-to-many relationships between the deployed components.

Example 22 may include the at least one computer readable medium of any of Examples 12 to 18, wherein the environment-specific rules include one or more of a business rule, an exposure rule, and a managed downtime rule.

Example 23 may include an electronic processing apparatus, comprising a database constructor to construct a dependency database of deployed components in an environment, a vulnerability tracer to trace a vulnerability against the dependency database and to determine one or more affected deployed components based on the trace, and a vulnerability resolver to retrieve environment-specific rules based on the determined one or more affected deployed components and to prioritize mitigation of the vulnerability for the one or more affected deployed components based at least in part on the retrieved environment-specific rules.

Example 24 may include the electronic processing system of Example 23, wherein the database constructor comprises a component scanner to scan the environment to identify the deployed components, and a dependency analyzer to analyze the identified deployed components in the environment and to determine dependencies between the deployed components.

Example 25 may include a vulnerability mitigation prioritizer apparatus, comprising means for constructing a dependency database of deployed components in an environment, means for tracing a vulnerability against the dependency database, means for determining one or more affected deployed components based on the trace, means for retrieving environment-specific rules based on the determined one or more affected deployed components, and means for prioritizing mitigation of the vulnerability for the one or more affected deployed components based at least in part on the retrieved environment-specific rules.

Example 26 may include the apparatus of Example 25, further comprising means for scanning the environment to identify the deployed components, means for analyzing the identified deployed components in the environment, and means for determining dependencies between the deployed components.

Example 27 may include the apparatus of Example 25, further comprising means for comparing data associated with the vulnerability against information in the dependency database to determine the one or more affected deployed components.

Example 28 may include the apparatus of Example 25, further comprising means for determining a quantitative measure of usage of the one or more affected deployed components.

Example 29 may include the apparatus of Example 25, further comprising means for determining a quantitative measure of exposure to internal and external attacks for the one or more affected deployed components.

Example 30 may include the apparatus of Example 25, further comprising means for building a mitigation strategy on a per deployed component basis.

Example 31 may include the apparatus of Example 25, further comprising means for providing a set of actions for mitigating one or more vulnerabilities in accordance with the prioritization.

Example 32 may include the apparatus of any of Examples 25 to 31, further comprising means for prioritizing mitigation of the vulnerability for the one or more affected deployed components based at least in part on one or more of a security-related rule, a number of users affected, a number of projects affected, a criticality of an affected project, and a number of data center sites affected.

Example 33 may include the apparatus of any of Examples 25 to 31, wherein the deployed components include one or more of an application, an executable file, a shared library, a function, an open source component, a script, and a configuration file.

Example 34 may include the apparatus of any of Examples 25 to 31, wherein the dependency database supports many-to-many relationships between the deployed components.

Example 35 may include the apparatus of any of Examples 25 to 31, wherein the environment-specific rules include one or more of a business rule, an exposure rule, and a managed downtime rule.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A method of managing a vulnerability, comprising:
constructing a dependency database of deployed components in an environment;
tracing a vulnerability against the dependency database;
determining one or more affected deployed components based on the trace;
retrieving environment-specific rules based on the determined one or more affected deployed components; and
prioritizing mitigation of the vulnerability for the one or more affected deployed components based at least in part on the retrieved environment-specific rules, wherein the retrieved environment-specific rules comprise a security-related rule, a number of users affected, a number of projects affected, a criticality of an affected project, and a number of data center sites affected.

2. The method of claim 1, further comprising:
scanning the environment to identify the deployed components;
analyzing the identified deployed components in the environment; and
determining dependencies between the deployed components.

3. The method of claim 1, further comprising:
comparing data associated with the vulnerability against information in the dependency database to determine the one or more affected deployed components.

4. The method of claim 1, further comprising:
determining a quantitative measure of usage of the one or more affected deployed components.

5. The method of claim 1, further comprising:
determining a quantitative measure of exposure to internal and external attacks for the one or more affected deployed components.

6. The method of claim 1, further comprising:
building a mitigation strategy on a per deployed component basis.

7. The method of claim 1, further comprising:
providing a set of actions for mitigating one or more vulnerabilities in accordance with the prioritization.

8. The method of claim 1, wherein the deployed components include one or more of an application, an executable file, a shared library, a function, an open source component, a script, and a configuration file.

9. The method of claim 1, wherein the dependency database supports many-to-many relationships between the deployed components.

10. The method of claim 1, wherein the environment-specific rules include one or more of a business rule, an exposure rule, and a managed downtime rule.

11. At least one non-transitory computer readable medium, comprising a set of instructions, which when executed by a computing device, cause the computing device to:
construct a dependency database of deployed components in an environment;
trace a vulnerability against the dependency database;
determine one or more affected deployed components based on the trace;
retrieve environment-specific rules based on the determined one or more affected deployed components; and
prioritize mitigation of the vulnerability for the one or more affected deployed components based at least in part on the retrieved environment-specific rules, wherein the retrieved environment-specific rules comprise a security-related rule, a number of users affected, a number of projects affected, a criticality of an affected project, and a number of data center sites affected.

12. The at least one non-transitory computer readable medium of claim 11, comprising a further set of instructions, which when executed by the computing device, cause the computing device to:
scan the environment to identify the deployed components;
analyze the identified deployed components in the environment; and
determine dependencies between the deployed components.

13. The at least one non-transitory computer readable medium of claim 11, comprising a further set of instructions, which when executed by the computing device, cause the computing device to:
compare data associated with the vulnerability against information in the dependency database to determine the one or more affected deployed components.

14. The at least one non-transitory computer readable medium of claim 11, comprising a further set of instructions, which when executed by the computing device, cause the computing device to:
determine a quantitative measure of usage of the one or more affected deployed components.

15. The at least one non-transitory computer readable medium of claim 11, comprising a further set of instructions, which when executed by the computing device, cause the computing device to:
determine a quantitative measure of exposure to internal and external attacks for the one or more affected deployed components.

16. The at least one non-transitory computer readable medium of claim 11, comprising a further set of instructions, which when executed by the computing device, cause the computing device to:
build a mitigation strategy on a per deployed component basis.

17. The at least one non-transitory computer readable medium of claim 11, comprising a further set of instructions, which when executed by the computing device, cause the computing device to:
provide a set of actions for mitigating one or more vulnerabilities in accordance with the prioritization.

18. The at least one non-transitory computer readable medium of claim 11, wherein the deployed components include one or more of an application, an executable file, a shared library, a function, an open source component, a script, and a configuration file.

19. The at least one non-transitory computer readable medium of claim 11, wherein the dependency database supports many-to-many relationships between the deployed components.

20. The at least one non-transitory computer readable medium of claim 11, wherein the environment-specific rules include one or more of a business rule, an exposure rule, and a managed downtime rule.

21. An electronic processing semiconductor apparatus, comprising:
one or more substrates; and
logic coupled to the one or more substrates, wherein the logic is implemented at least partly in one or more of configurable logic or fixed-functionality hardware logic, the logic comprising:

a database constructor to construct a dependency database of deployed components in an environment;

a vulnerability tracer to trace a vulnerability against the dependency database and to determine one or more affected deployed components based on the trace; and a vulnerability resolver to retrieve environment-specific rules based on the determined one or more affected deployed components and to prioritize mitigation of the vulnerability for the one or more affected deployed components based at least in part on the retrieved environment-specific rules, wherein the retrieved environment-specific rules comprise a security-related rule, a number of users affected, a number of projects affected, a criticality of an affected project, and a number of data center sites affected.

22. The electronic processing semiconductor apparatus of claim 21, wherein the database constructor comprises:

a component scanner to scan the environment to identify the deployed components; and a dependency analyzer to analyze the identified deployed components in the environment and to determine dependencies between the deployed components.

* * * * *